(12) United States Patent
Lille et al.

(10) Patent No.: US 7,813,080 B2
(45) Date of Patent: Oct. 12, 2010

(54) ENHANCED PLANARIZATION LIFTOFF STRUCTURE AND METHOD FOR MAKING THE SAME

(75) Inventors: Jeffrey S. Lille, Sunnyvale, CA (US); Amanda Baer, Campbell, CA (US); John Jaekoyun Yang, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 945 days.

(21) Appl. No.: 11/644,159

(22) Filed: Dec. 22, 2006

(65) Prior Publication Data

US 2008/0151422 A1 Jun. 26, 2008

(51) Int. Cl.
*G11B 5/127* (2006.01)
(52) U.S. Cl. ................................. 360/125.12
(58) Field of Classification Search ............... 360/110, 360/125.12, 125.2, 125.1, 125.11
See application file for complete search history.

(56) References Cited

U.S. PATENT DOCUMENTS

| 7,186,348 B2* | 3/2007 | Chen et al. ............. 216/22 |
| 2004/0257699 A1* | 12/2004 | Hsu et al. ............... 360/119 |
| 2005/0024766 A1* | 2/2005 | Khera et al. ............ 360/125 |
| 2005/0024771 A1* | 2/2005 | Le .......................... 360/126 |
| 2005/0201011 A1* | 9/2005 | Dill et al. ............... 360/126 |
| 2006/0000795 A1* | 1/2006 | Chen et al. .............. 216/22 |
| 2006/0198048 A1* | 9/2006 | Flint et al. .............. 360/126 |

* cited by examiner

*Primary Examiner*—Allen T Cao

(57) ABSTRACT

Systems and methods for enhanced planarization liftoff structures. In accordance with a first method embodiment, a method for manufacturing a pole tip for magnetic recording comprises accessing a wafer comprising a plurality of pole tips and a plurality of pole tip masks corresponding to the plurality of pole tips. Non magnetic material is filled adjacent to the plurality of pole tips. Material adjacent to the plurality of pole tips is etched. Subsequent to the etching, the wafer is planarized to a level equal to or higher than a level of the trailing edges of the plurality of pole tips. The enhanced liftoff structure enables decreased planarization processing, resulting in a decreased process window. As a beneficial result, manufacturing throughput and quality are improved.

13 Claims, 9 Drawing Sheets

ENHANCED PLANARIZATION LIFTOFF STRUCTURE AND METHOD FOR MAKING THE SAME

TECHNICAL FIELD

Embodiments of the present invention relate to the field of manufacturing hard disk drives, and more particularly to an enhanced planarization liftoff structure and method for making the same.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 40 years ago and resembles a phonograph. That is, the hard drive model includes a plurality of storage disks or hard disks vertically aligned about a central core that spin at a standard rotational speed. A plurality of magnetic read/write transducer heads, for example, one head per surface of a disk, is mounted on the actuator arm. The actuator arm is utilized to reach out over the disk to or from a location on the disk where information is stored. The complete assembly, e.g., the arm and head, is known as a head gimbal assembly (HGA).

In operation, the plurality of hard disks is rotated at a set speed via a spindle motor assembly having a central drive hub. Additionally, there are channels or tracks evenly spaced at known intervals across the disks. When a request for a read of a specific portion or track is received, the hard disk drive aligns a head, via the arm, over the specific track location and the head reads the information from the disk. In the same manner, when a request for a write of a specific portion or track is received, the hard disk drive aligns a head, via the arm, over the specific track location and the head writes the information to the disk.

Over the years, refinements of the disk and the head have provided great reductions in the size of the hard disk drive. For example, the original hard disk drive had a disk diameter of 24 inches. Modern hard disk drives are generally much smaller and include disk diameters of less than 2.5 inches (micro drives are significantly smaller than this dimension). Refinements also include the use of smaller components and laser advances within the head portion. That is, by reducing the read/write tolerances of the head portion, the tracks on the disk can be reduced in size by the same margin. Thus, as modern laser and other micro recognition technology are applied to the head, the track size on the disk can be further compressed.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPM) can be achieved. For example, it is not uncommon for a hard disk drive to reach speeds of 15,000 RPM. This second refinement provides weight and size reductions to the hard disk drive and increases the linear density of information per track. Increased rates of revolution also provide a faster read and write rate for the disk and decrease the latency, or time required for a data area to become located beneath a head, thereby providing increased speed for accessing data. The increase in data acquisition speed due to the increased RPM of the disk drive and the more efficient read/write head portion provide modern computers with hard disk speed and storage capabilities that are continually increasing.

A third refinement to the hard disk drive is the use of perpendicular recording. Previously, bits, e.g., represented as different alignments of magnetized portions of a recording media, or as transitions of such portions, were recorded substantially in the plane, e.g., parallel to the plane, of the rotating recording media. With a system of perpendicular recording, the bits are recorded perpendicular to the plane of the recording media, resulting in vastly improved storage density. For example, perpendicular recording is believed to be capable of delivering up to ten times the storage density of longitudinal recording, for the same recording media.

FIG. 1 (conventional art) illustrates a side sectional view of a recording element and media, as are utilized for perpendicular recording in a hard disk drive. Recording element 100 is a monopole inductive write element. Disk 110 comprises a recording media 130, and a soft underlayer 120.

Recording element 100 comprises pole tip 105 and return pole 107. Pole tip 105 is a relatively small feature that concentrates a magnetic field 140 in the area of the recording media 130. The concentrated magnetic field 140 is sufficient to magnetize a portion of the recording media 130. Return pole 107 is a relatively large feature. The magnetic field 140 density near return pole 107 is insufficient to magnetize a portion of the recording media 130. Consequently, "bits" are written by, and in the vicinity of, recording pole 105.

The design and construction of recording element 100, and more particularly pole tip 105, are critical to the performance of a disk drive. For example, pole tip 105 must comprise necessary magnetic properties to effectively create the recorded bits. In addition, pole tip 105 also must comprise necessary aerodynamic properties to form an air bearing surface (ABS) to "fly" over the disk. It is appreciated that the design and manufacture of pole tip 105 is complex, and that numerous engineering tradeoffs in the areas of materials, shape, manufacturing techniques and the like interact with one another. Consequently, improvements in the design and manufacture of disk drive recording elements are continually sought.

SUMMARY

Accordingly, there is a need for systems and methods for enhanced planarization liftoff structures as used in manufacturing recording elements. Additionally, in conjunction with the aforementioned need, novel systems and methods of bulk removal, e.g., etching, of material adjacent to a recording pole tip are needed. A further need, in conjunction with the aforementioned needs, is for enhanced planarization liftoff structures that are compatible and complimentary with existing recording element processing systems and manufacturing processes. Embodiments in accordance with the present invention provide for these needs.

In accordance with embodiments of the present invention, material adjacent to a pole is etched to gain access to a polymer pole metal mask in order to remove the mask.

Systems and methods for enhanced planarization liftoff structures are disclosed. In accordance with a first embodiment, a process of manufacturing a pole tip for magnetic recording includes accessing a wafer comprising a plurality of pole tips and a plurality of pole tip masks corresponding to the plurality of pole tips. Non magnetic material is filled adjacent to the plurality of pole tips. Material adjacent to the plurality of pole tips is etched. Subsequent to the etching, the wafer is planarized to a level equal to or higher than a level of the trailing edges of the plurality of pole tips.

In accordance with another embodiment of the present invention, a magnetic recording head includes a pole tip for imparting a magnetic orientation to a magnetic recording media. The pole tip comprises ferromagnetic material. The magnetic recording head comprises an etching profile outside of the pole tip. The etching profile may intersect a plane of a trailing edge of the pole tip. The pole tip may further include a laminate of the ferromagnetic material and a non ferromagnetic material.

BEST MODES FOR CARRYING OUT THE INVENTION

Reference will now be made in detail to various embodiments of the invention, an enhanced planarization liftoff structure and method for making the same, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Enhanced Planarization Liftoff Structure and Method for Making the Same

A wafer is a basic "building block" upon which numerous processing actions take place to produce very small structures. Wafers also form a similar building block for the production of magnetic read and/or write heads as used in hard disk drives. The production of such devices can comprise many different processing steps. While the drawings presented herein are directed to production of a single recording pole, it is to be appreciated that such poles are generally constructed with multiple units per wafer.

Figure 1:
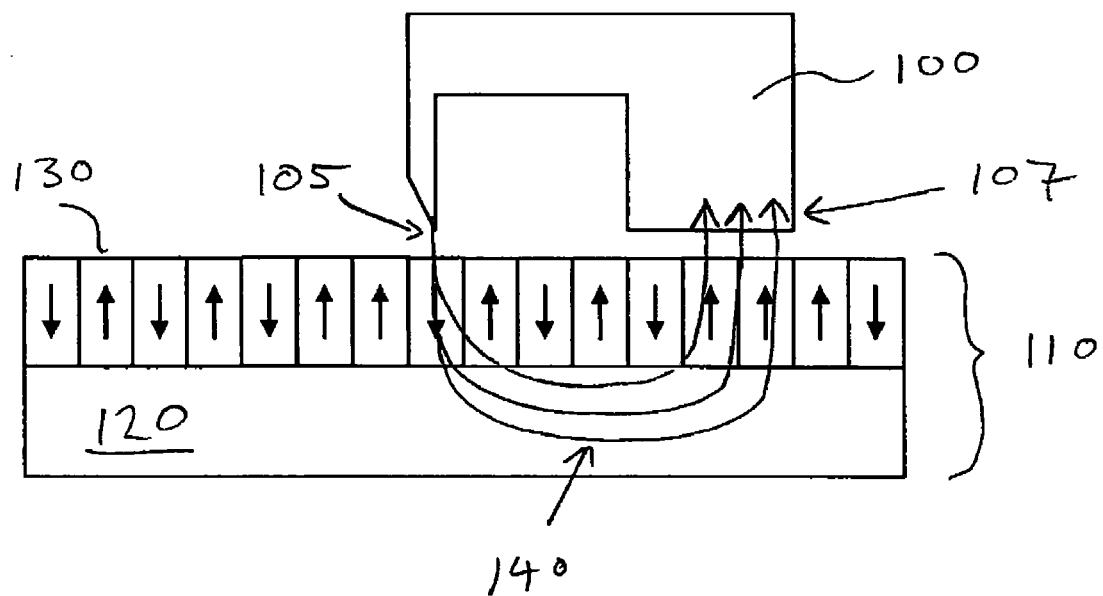
FIG. 1 (conventional art) illustrates a side sectional view of a recording element and media, as are utilized for perpendicular recording in a hard disk drive.
Figure 2:
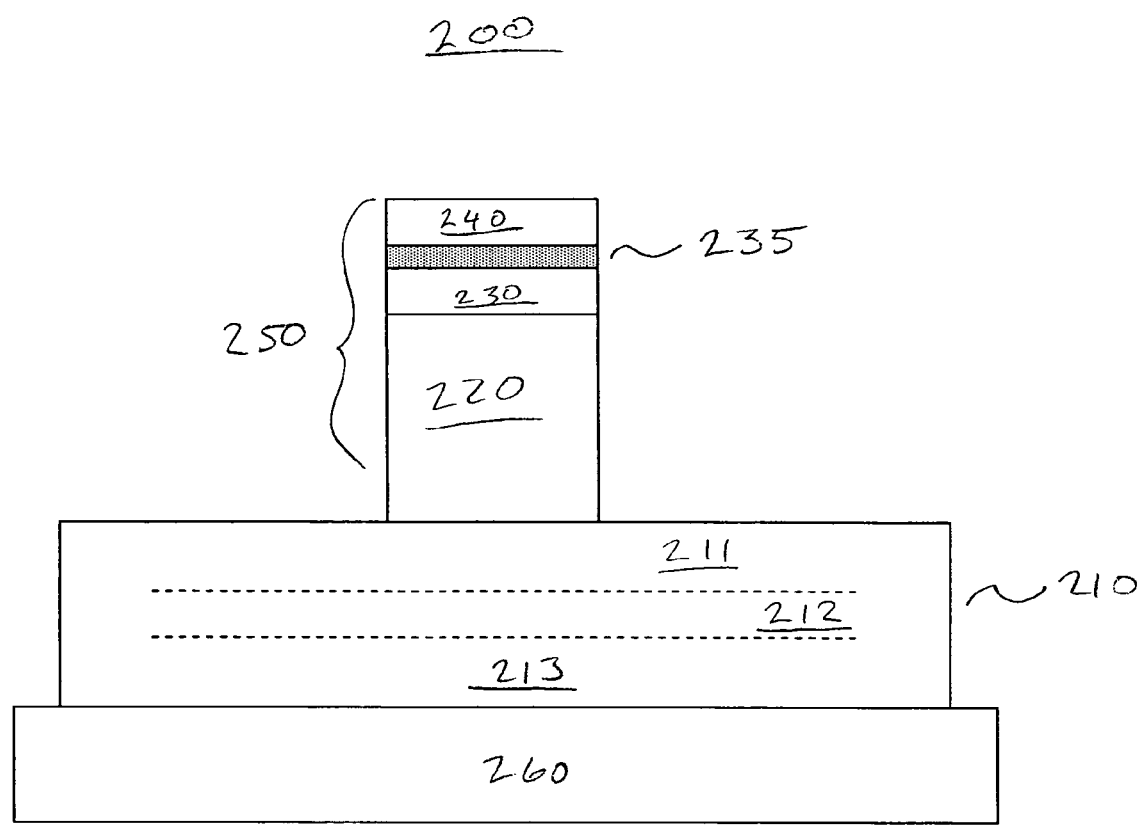
FIGS. 2, 3, 4A, 4B, 5, 6A and 6B illustrate side sectional views of intermediate wafer structures in the formation of a pole tip for perpendicular recording, in accordance with embodiments of the present invention.

FIG. 2 illustrates a side sectional view of an intermediate wafer structure 200 in forming a pole tip for perpendicular recording, in accordance with embodiments of the present invention. The elements of FIG. 2 are as though viewed from the recording media. For example, the section illustrated in FIG. 2 is parallel to the recording media.

FIG. 2 illustrates a layer 210 of pole tip material. Pole tip material is typically a laminate, for example, comprising both ferromagnetic material and non ferromagnetic material. As illustrated, pole tip material 210 is about 50-250 nm thick and comprises a layer 211 of Cobalt-Iron (CoFe), a layer 212 of Nickel-Chromium (NiCr, e.g., $Ni_{80}Cr_{20}$), and another layer 213 of Cobalt-Iron (CoFe). Layer 210 of pole tip material is disposed upon a layer 260 of non magnetic material, e.g., alumina ($AlO_x$). It is appreciated that embodiments of the present invention are well suited to other materials.

A pole tip mask 250 is formed on layer 210 of pole tip material. Pole tip mask 250 comprises a layer 220 of polymer mask material, e.g., DURIMIDE®, a registered trademark of Fujifilm Electronic Materials USA, Inc., of North Kingstown, R.I., of approximately 1 µm in thickness is disposed onto the layer 210 of pole tip material. A hard mask layer 230 of silicon dioxide ($SiO_2$) of approximately 0.2 µm in thickness is disposed onto the layer 220 of polymer mask material.

A thin coating 235, e.g., of DURIMIDE®, approximately 120 nm in thickness, may be applied over hard mask layer 230. Coating 235 may serve as an adhesion promoter and anti-reflective coating (ARC).

A layer 240 of photo resist material of approximately 0.25 µm in thickness is disposed onto the hard mask layer 230 or coating 235. The layer 240 is used to pattern the layer 230.

Layer 230 may be patterned in an etching process, e.g., a reactive ion etch (RIE) process. For example, an Oxygen-containing RIE process may pattern the layer 240 into the coating 235. A Carbon hydro-trifluoride ($CHF_3$) based reactive ion etch may be used to pattern the stencil into the layer 230.

After patterning, layer 230 is used as a hard mask for etching, e.g., an Oxygen-containing reactive ion etch (RIE) process. The etching process removes unwanted polymer mask material from unmasked areas of the pole tip material 210.

Figure 3:
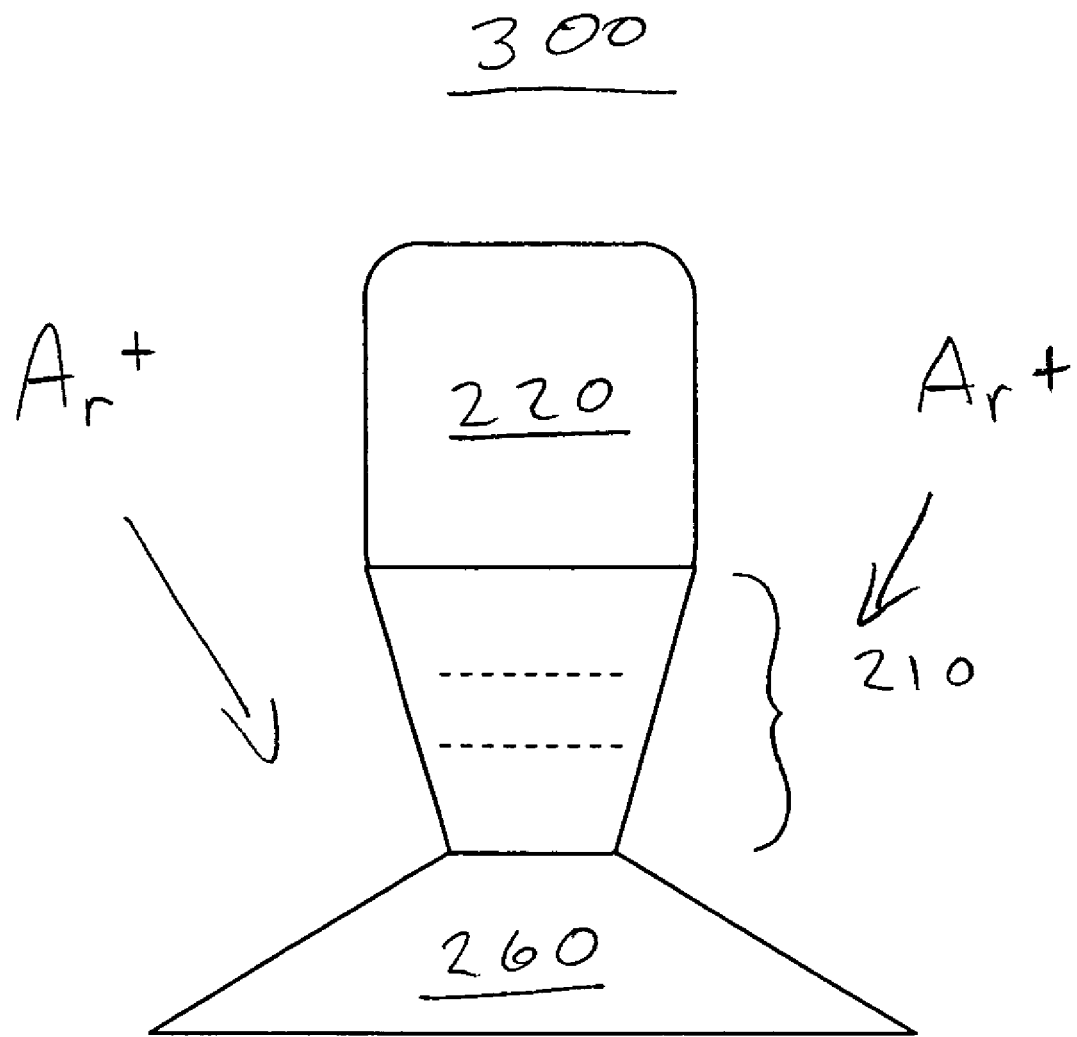

FIG. 3 illustrates a side sectional view of an intermediate wafer structure 300 in forming a pole tip for perpendicular recording, in accordance with embodiments of the present invention. A process of ion milling, e.g., utilizing Argon ions ($Ar^+$), etches away unmasked portions of layer 210 of pole tip material. After milling, layer 210 of pole tip material may be, for example, about 0.1 to 0.4 µm thick. The angle and duration of the ion milling may be changed to form a desired shape of pole tip material. It is to be appreciated that some portions of hard mask layer 230 as well as some portions of layer 260 of non magnetic material may also be removed by the ion milling.

Figure 4A:
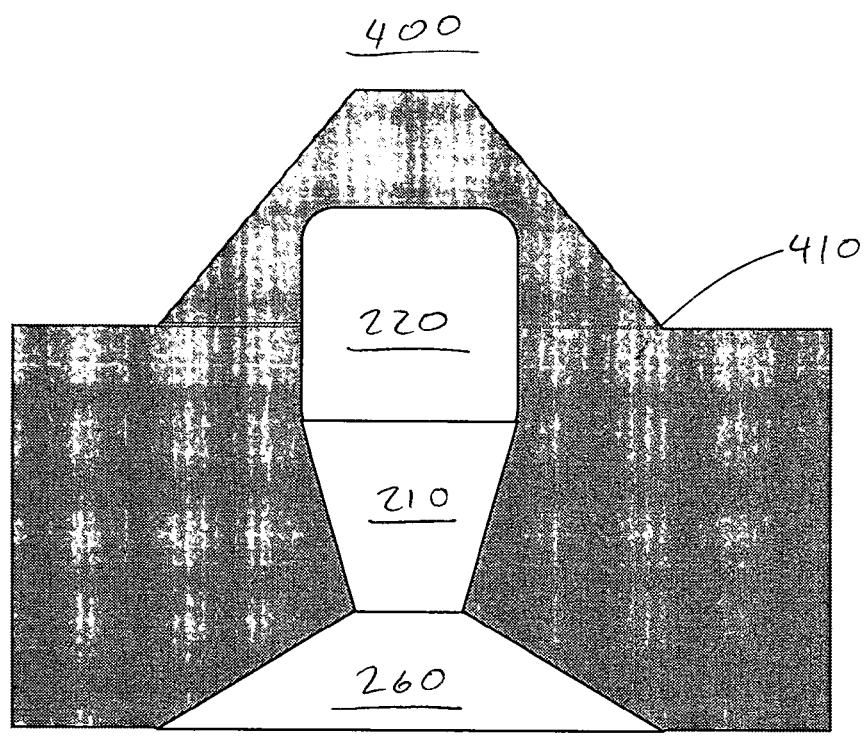

FIG. 4A illustrates a side sectional view of an intermediate wafer structure 400 in forming a pole tip for perpendicular recording, in accordance with embodiments of the present invention. The intermediate structure 300 of FIG. 3 is filled with a non magnetic material 410, e.g., alumina ($AlO_x$) or silica ($SiO_x$). Non magnetic material 410 fills the regions of layers 260 and 210, as well as covers hard mask layer 220.

Figure 4B:
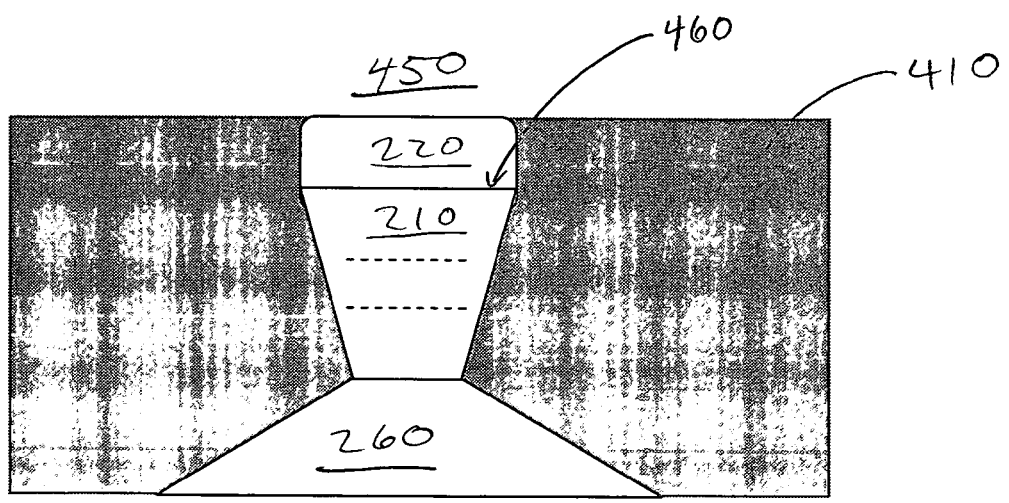

FIG. 4B illustrates a side sectional view of an intermediate wafer structure 450 in forming a pole tip for perpendicular recording, in accordance with embodiments of the present invention. A chemical mechanical polishing (CMP) process may be used to remove a portion of non magnetic material 410 down to a level within hard mask layer 220. In accordance with embodiments of the present invention, this CMP process should not remove all of the material of hard mask layer 220. More particularly, the top edge of layer 210 in the view of FIG. 4B will ultimately form the trailing edge 460 of a pole tip. The trailing edge 460 of a pole tip defines the size of the recorded bit. Thus, the size of the trailing edge 460, as well as the geometry of the corners, e.g., sharpness, of trailing edge 460, are important for the performance of the recording system of a hard disk drive. In general, it is difficult to control a chemical mechanical polishing process with the precision necessary to remove non magnetic material 410 sufficiently close to the edge of pole tip material 210 without deleteriously affecting the dimension of the top edge of layer 210.

Figure 5:
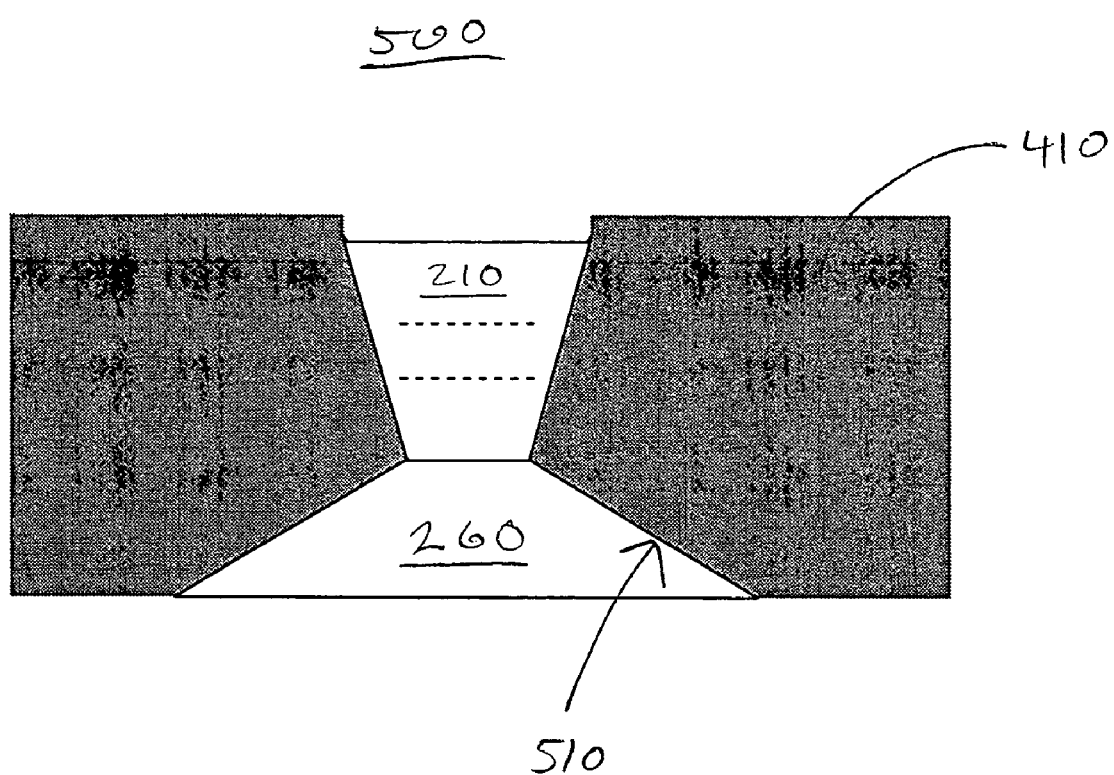

FIG. 5 illustrates a side sectional view of an intermediate wafer structure 500 in forming a pole tip for perpendicular recording, in accordance with embodiments of the present invention. A solvent etch, e.g., N-Methyl-2-Pyrrolidone (NMP), removes the remaining portions of hard mask layer 220 without removing non magnetic material 410. It is to be appreciated that non magnetic material 410 may be the same material as layer 260 of non magnetic material. In such a case, layer 260 and material 410 may form a substantially continuous structure. However, it is appreciated that there will generally be small, e.g., microscopic, differences in the composition of the material and there is a boundary or profile 510 between the two portions of material.

Referring once again to FIGS. 4A and 4B, it is to be appreciated that it may be difficult to control a chemical mechanical polishing (CMP) process to consistently stop within hard mask layer 220, as illustrated in FIG. 4B. For example, the rate of polishing is related to the prominence of the feature being polished. Thus, when the "pointy" top of layer 410 (FIG. 4A) is being polished, there is relatively little surface area being polished and that surface is higher than the surrounding material. Consequently, the thickness of layer 410 over layer 220 decreases very fast during polishing. As the surface area being polished increases and/or the features being polished flatten out, the rate of thickness change decreases. As the shape and thickness of the over coating of layer 410 are not well controlled, the rate of removal of layer 410 varies widely and often unpredictably.

Figure 6A:
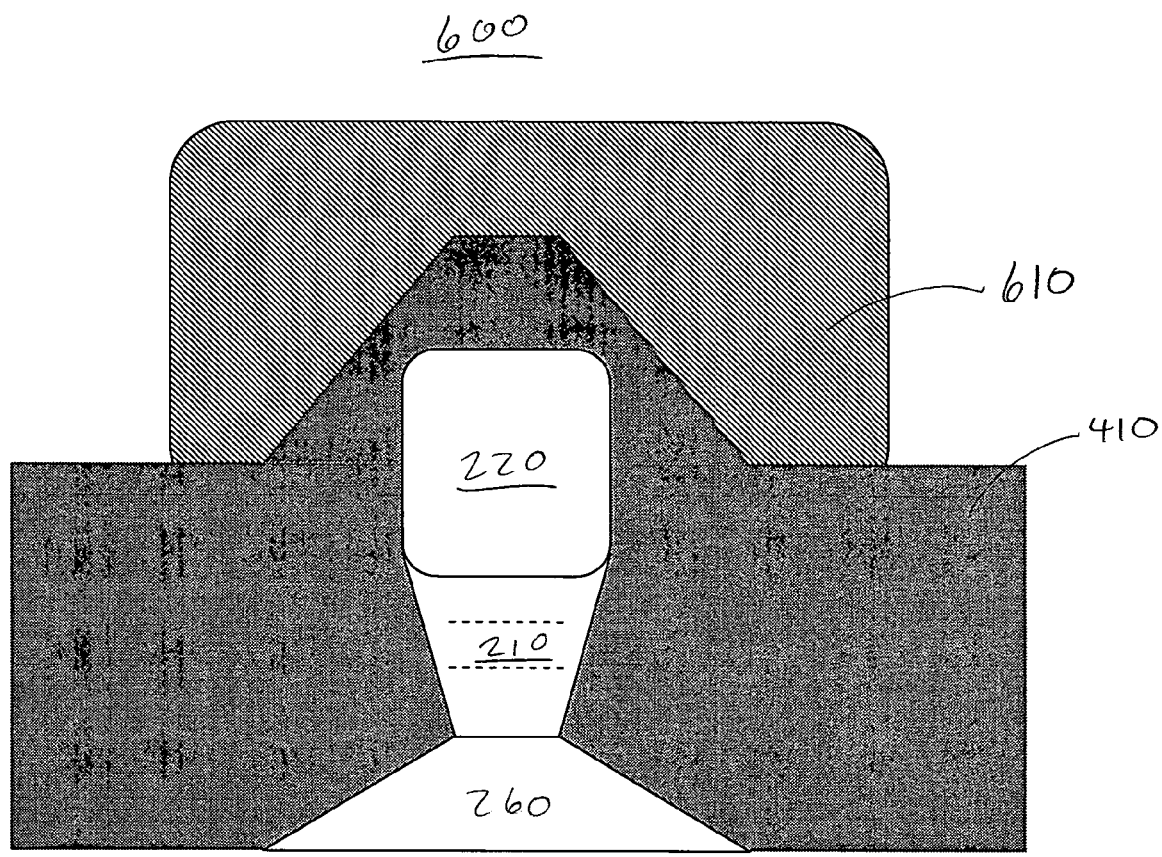

FIG. 6A illustrates a side sectional view of an intermediate wafer structure 600 in forming a pole tip for perpendicular recording, in accordance with embodiments of the present invention. A mask 610 is disposed over a layer of non magnetic material 410 as shown in intermediate structure 450 (FIG. 4A). For example, intermediate structure 600 comprises intermediate structure 450 and mask 610.

Mask 610 extends horizontally and vertically beyond the region of hard mask 220, e.g., by several microns. Mask 610 may be non critically aligned and may be, for example, between 5 and 15 μm wide and between 1 and 3 μm thick. It is appreciated that mask 610 should at least extend over, e.g., overlap, pole tip mask 250.

Figure 6B:
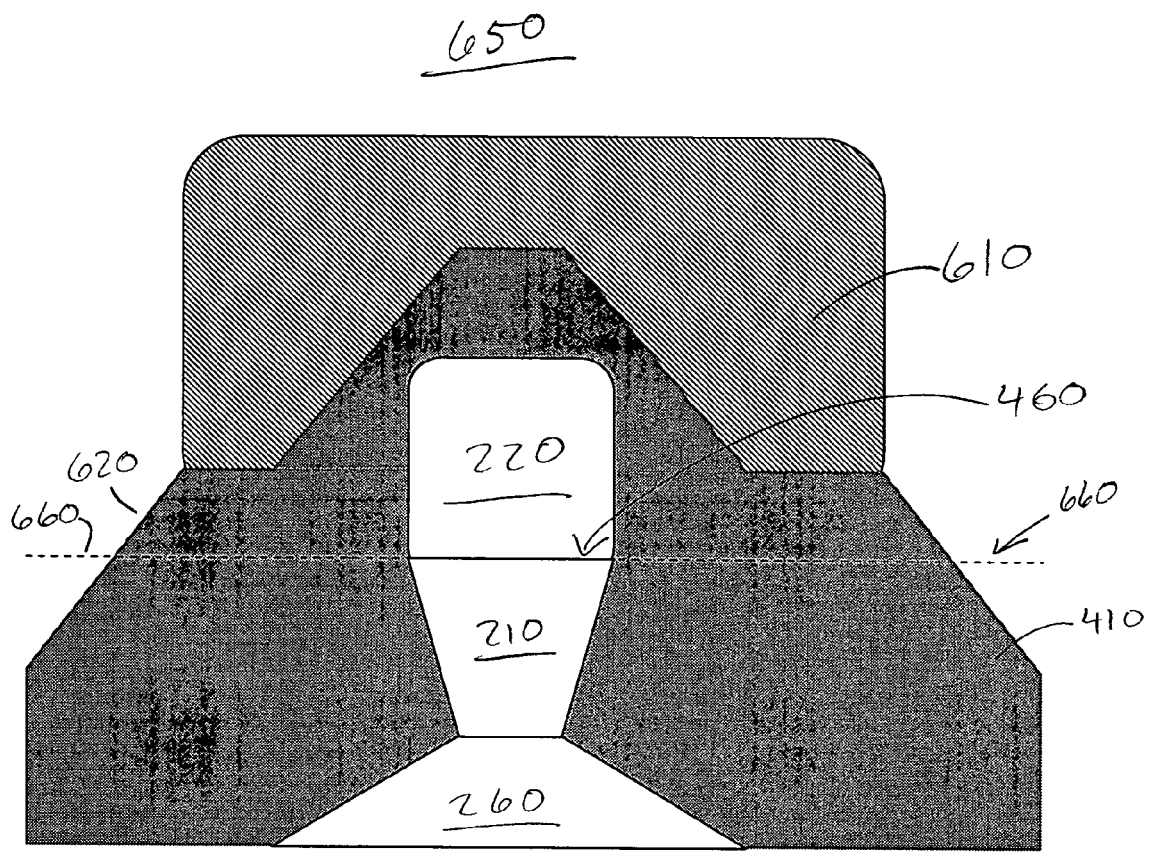

FIG. 6B illustrates a side sectional view of an intermediate wafer structure 650 in forming a pole tip for perpendicular recording, in accordance with embodiments of the present invention. Mask 610 is used in an etching process, for example, an ion mill etch, a wet etch, e.g., utilizing ethylenediaminetetraacetic acid (EDTA), a reactive ion etch (RIE), a plasma etch or the like. The etching, guided by mask 610, removes non magnetic material 410 at the same horizontal level in the view of FIG. 6B, to layer 210 of pole tip material. For example, non magnetic material is removed in the plane 660 of trailing edge 460. It is to be appreciated that non magnetic material 410 may or may not be removed in areas below mask 610, depending upon particulars of the etching process utilized. It is to be further appreciated that portions of pole tip mask 220 and/or pole tip material 210 should not be removed by the etching process. For example, non magnetic material 410 is only etched outside of the vertical extension of the edges of pole tip mask 220.

In removing portions of non magnetic material 410 that are relatively far away from hard mask 220, the total amount of material to be removed by chemical mechanical polishing (CMP) is reduced. For example, much of the non magnetic material that was removed via CMP under the conventional art is removed by the etching process. For example, 50 percent or more of the area of a wafer may be etched, e.g., surrounding pole tips. Advantageously, such etching is generally faster than CMP operations.

As the amount of material to be removed by chemical mechanical polishing (CMP) is reduced, the polishing time is correspondingly reduced. As polishing time is related to variation in polishing depth, a reduced polishing time consequently reduces the variation in polishing depth. As a beneficial result, the intermediate structure 650 enables advantageously improved process control in a chemical mechanical polishing (CMP) process of manufacturing a recording pole tip. Consequently, an intermediate structure, e.g., intermediate structure 450 (FIG. 4B) in forming a pole tip for perpendicular recording, may be produced with tighter tolerances and higher manufacturing quality.

It is to be appreciated that, in accordance with embodiments of the present invention, intermediate structure 650 comprises an etch profile 620 in the plane (in the perspective of FIG. 6B) of the pole tip material 210. In general, the etch profile will intersect the plane 660 of the trailing edge 460 of the pole tip. In general, the etch profile 620 will be symmetric on both sides of pole tip material 210.

Figure 7:
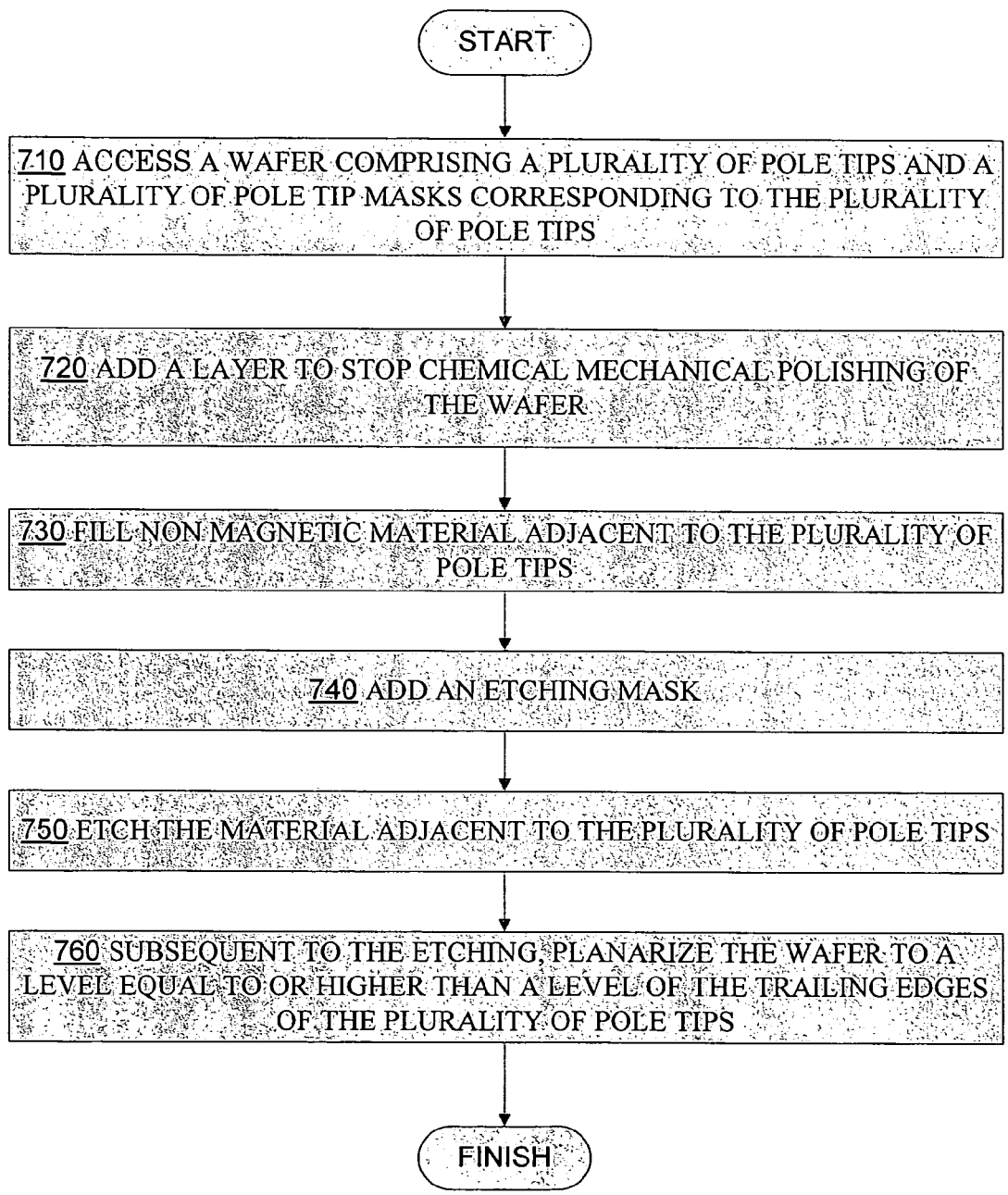
FIG. 7 illustrates a flow chart for an exemplary method of manufacturing a pole tip for magnetic recording, in accordance with embodiments of the present invention.

FIG. 7 illustrates a flow chart for an exemplary method 700 of manufacturing a pole tip for magnetic recording, in accordance with embodiments of the present invention. In 710, a wafer comprising a plurality of pole tips and a plurality of pole tip masks corresponding to the plurality of pole tips is accessed, for example by computer controlled wafer processing equipment. It is appreciated that such pole tips are typically assembled via wafer processing techniques. For example, FIG. 3 illustrates one of a plurality of pole tips and pole tip masks.

In optional 720, a layer to stop chemical mechanical polishing (CMP) may be added to the structure. CMP stop layers are well known and any of a number of well known ones can be used, and may comprise, for example, diamond like Carbon (DLC) or Rhodium (Rh).

In 730, non magnetic material is filled adjacent to the plurality of pole tips, for example, as illustrated in FIG. 4A. In optional 740, a mask for etching is added, for example mask 610 as illustrated in FIG. 6A.

In 750, material adjacent to the plurality of pole tips is etched, for example, as illustrated in FIG. 6B. In 760, subsequent to the etching, the wafer is planarized, e.g., via chemical mechanical polishing, to a level equal to or higher than a level of the trailing edges of the plurality of pole tips, for example, equal to or higher than a level of plane 660 (FIG. 6B).

In this novel manner, the amount of material removed during a chemical mechanical polishing process is decreased, and hence the time required for chemical mechanical polishing is decreased. As the time required for chemical mechanical polishing is decreased, the polishing depth variation is correspondingly also decreased. As a beneficial result, the material above the trailing edge of a pole tip may be removed faster and with greater precision than under the conventional art, resulting in improved manufacturing throughput and quality.

While the method of the embodiment illustrated in flow chart 700 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Figure 8:
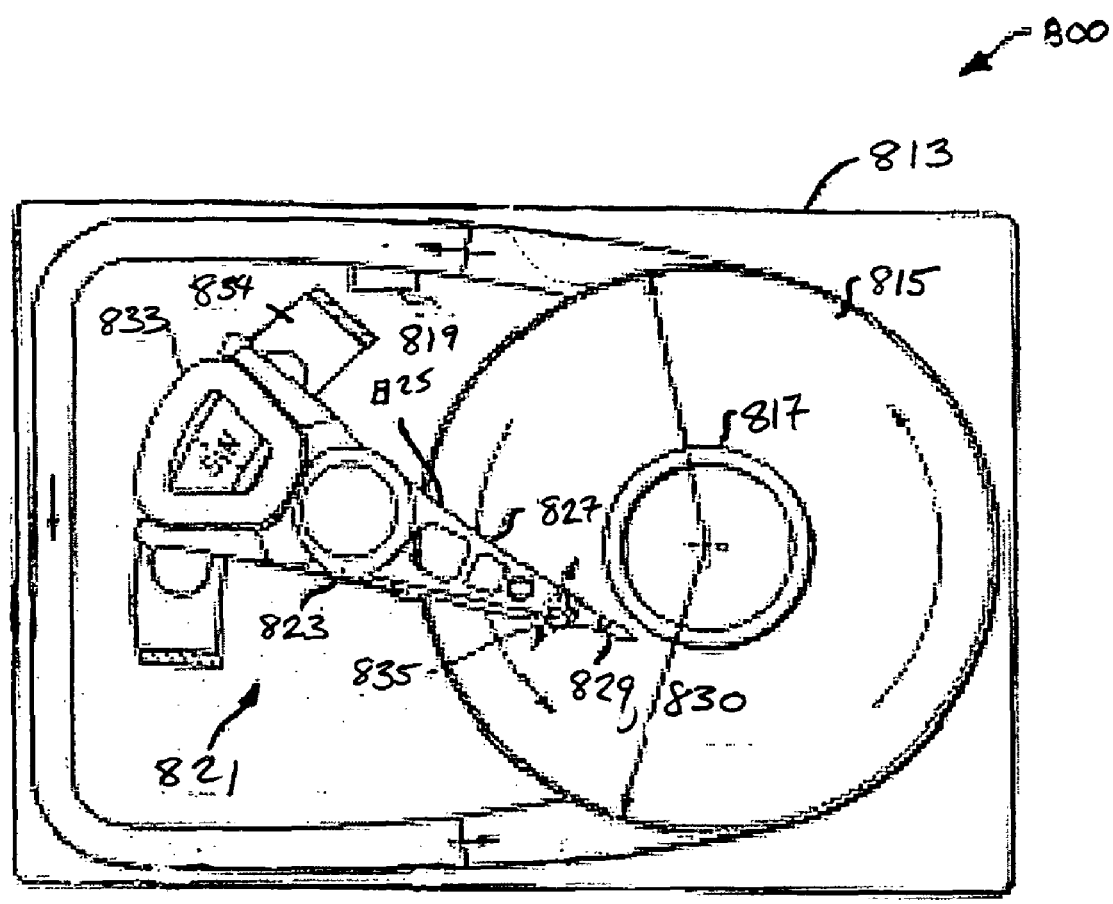
FIG. 8 is a drawing of an exemplary embodiment of an information storage system comprising a magnetic hard disk file or drive for a computer system, in accordance with embodiments of the present invention.

FIG. 8 is a drawing of an exemplary embodiment of an information storage system comprising a magnetic hard disk file or drive 800 for a computer system, in accordance with embodiments of the present invention. An important element of drive 800 is the magnetic recording head 830, part of slider 829. Slider 829 is further described below. In accordance with embodiments of the present invention, recording head 830 comprises a pole tip, e.g., pole tip 210 of FIG. 2. It is to be appreciated that recording head 830 further comprises an etch profile, e.g., etch profile 620 (FIG. 6B) in the plane (in the perspective of FIG. 6B) of the pole tip material. In accordance with embodiments of the present invention, the pole tip of recording head 830 may be manufactured with greater precision, quality and throughput, in comparison with the conventional art.

Drive 800 has an outer housing or base 813 containing a disk pack having at least one media or magnetic disk 815. A spindle motor assembly having a central drive hub 817 rotates the disk or disks 815. An actuator 821 comprises a plurality of parallel actuator arms 825 (one shown) in the form of a comb that is movably or pivotally mounted to base 813 about a pivot assembly 823. A controller 819 is also mounted to base 813 for selectively moving the comb of arms 825 relative to disk 815.

In the embodiment shown, each arm 825 has extending from it at least one cantilevered load beam and suspension 827. A magnetic read/write transducer or head 830 is mounted on a slider 829 and secured to a flexure that is flexibly mounted to each suspension 827. The read/write heads 830 magnetically read data from and/or magnetically write data to disk 815. The level of integration called the head gimbal assembly is head 830 and the slider 829, which are mounted on suspension 827. The slider 829 is usually bonded to the end of suspension 827. The head 830 is typically pico size (approximately 1250×1000×300 microns) and formed from ceramic or intermetallic materials. The head 830 also may be of "femto" size (approximately 850×700×230 microns) and is pre-loaded against the surface of disk 115 (in the range two to ten grams) by suspension 827.

Suspensions 827 have a spring-like quality, which biases or urges the air-bearing surface of the slider 829 against the disk 815 to cause the slider 829 to fly at a precise distance from the disk. A voice coil 833 free to move within a conventional voice coil motor magnet assembly 134 (top pole not shown) is also mounted to arms 825 opposite the head gimbal assemblies. Movement of the actuator 821 (indicated by arrow 835) by controller 819 moves the head gimbal assemblies along radial arcs across tracks on the disk 815 until the heads settle on their respective target tracks. The head gimbal assemblies operate in a conventional manner and always move in unison with one another, unless drive 800 uses multiple independent actuators (not shown) wherein the arms can move independently of one another.

Embodiments in accordance with the present invention provide for systems and methods for enhanced planarization liftoff structures as used in recording elements. Additional embodiments in accordance with the present invention provide for systems and methods of bulk removal, e.g., etching, of material adjacent to a recording pole tip. Further, embodiments in accordance with the present invention provide for enhanced planarization liftoff structures that are compatible and complimentary with existing recording element processing systems and manufacturing processes.

Embodiments in accordance with the present invention, enhanced planarization liftoff structure and method for making the same, are thus described. While the present invention has been described in particular embodiments, it should be appreciated that the present invention should not be construed as limited by such embodiments, but rather construed according to the below claims.

What is claimed is:

1. A magnetic recording head comprising:
   a pole tip for imparting a magnetic orientation to a magnetic recording media;
   said pole tip comprising ferromagnetic material; and
   said magnetic recording head comprising an etching profile outside of said pole tip.

2. The magnetic recording head of claim 1 wherein said pole tip comprises a laminate of said ferromagnetic material and a non ferromagnetic material.

3. The magnetic recording head of claim 1 wherein said etching profile intersects a plane of a trailing edge of said pole tip.

4. The magnetic recording head of claim 1 comprising non magnetic material on both sides of said etching profile.

5. The magnetic recording head of claim 4 wherein said both sides of said etching profile comprise substantially the same material.

6. The magnetic recording head of claim 1 wherein said etching profile is symmetric about said pole tip in the plane of said pole tip.

7. The magnetic recording head of claim 1 comprising a second etching profile below a plane of a trailing edge of said pole tip.

8. A hard disk drive comprising:
   disk comprising magnetic recording media;
   a motor for rotating said disk; and
   a magnetic recording head disposed above said rotating disk for imparting a magnetic orientation to said magnetic recording media; wherein said magnetic recording head comprises:
   a pole tip for said imparting;
   said pole tip comprising ferromagnetic material; and
   said magnetic recording head comprising an etching profile outside of said pole tip in a plane parallel to said disk.

9. The magnetic recording head of claim 8 wherein said pole tip comprises a laminate of said ferromagnetic material and a non ferromagnetic material.

10. The magnetic recording head of claim 8 wherein said etching profile intersects a plane of a trailing edge of said pole tip.

11. The magnetic recording head of claim 8 comprising non magnetic material on both sides of said etching profile.

12. The magnetic recording head of claim 8 wherein said both sides of said etching profile comprise substantially the same material.

13. The magnetic recording head of claim 8 wherein said etching profile is symmetric about said pole tip in the plane of said pole tip.

* * * * *